(12) United States Patent
Azaria et al.

(10) Patent No.: US 11,656,783 B2
(45) Date of Patent: May 23, 2023

(54) ACHIEVING NEAR-ZERO ADDED LATENCY FOR ANY POINT IN TIME OS KERNEL-BASED APPLICATION REPLICATION

(71) Applicant: EMC IP Holding Company LLC, Hopkinton, MA (US)

(72) Inventors: Itay Azaria, Dimona (IL); Kfir Wolfson, Beer Sheva (IL); Jehuda Shemer, Kfar Saba (IL); Saar Cohen, Mishmeret (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 402 days.

(21) Appl. No.: 16/803,630

(22) Filed: Feb. 27, 2020

(65) Prior Publication Data
US 2021/0271391 A1    Sep. 2, 2021

(51) Int. Cl.
*G06F 3/06*    (2006.01)
*G06F 11/14*    (2006.01)

(52) U.S. Cl.
CPC ............ *G06F 3/065* (2013.01); *G06F 3/0611* (2013.01); *G06F 3/0619* (2013.01); *G06F 3/0679* (2013.01); *G06F 11/1471* (2013.01); *G06F 2201/82* (2013.01)

(58) Field of Classification Search
CPC ...... G06F 3/065; G06F 3/0611; G06F 3/0619; G06F 3/0679; G06F 11/1471; G06F 2201/82; G06F 2201/855; G06F 3/067; G06F 11/2074

USPC .......................................................... 714/15
See application file for complete search history.

(56) References Cited

U.S. PATENT DOCUMENTS

| | | | |
|---|---|---|---|
| 6,970,987 B1 † | 11/2005 | Ji | |
| 8,429,362 B1 * | 4/2013 | Natanzon | G06F 3/067 |
| | | | 714/6.1 |
| 8,478,955 B1 * | 7/2013 | Natanzon | G06F 11/2074 |
| | | | 707/648 |
| 8,527,990 B1 | 9/2013 | Marathe et al. | |
| 8,600,945 B1 * | 12/2013 | Natanzon | G06F 17/00 |
| | | | 707/648 |
| 8,806,161 B1 | 8/2014 | Natanzon | |
| 10,108,507 B1 * | 10/2018 | Natanzon | G06F 11/1471 |
| 10,191,687 B1 * | 1/2019 | Baruch | G06F 11/14 |
| 2016/0342486 A1 † | 11/2016 | Kedem et al. | |

\* cited by examiner
† cited by third party

*Primary Examiner* — Yair Leibovich
(74) *Attorney, Agent, or Firm* — Workman Nydegger

(57) ABSTRACT

One example method includes intercepting an IO issued by an application, writing the IO and IO metadata to a splitter journal in NVM, forwarding the IO to storage, and asynchronous with operations occurring along an IO path between the application and storage, evacuating the splitter journal by sending the IO and IO metadata from the splitter journal to a replication site. In this example, sending the IO and IO metadata from the journal to the replication site does not increase a latency associated with the operations on the IO path.

20 Claims, 4 Drawing Sheets

ACHIEVING NEAR-ZERO ADDED LATENCY FOR ANY POINT IN TIME OS KERNEL-BASED APPLICATION REPLICATION

RELATED APPLICATIONS

This application is related to U.S. patent application Ser. No. 16/803,626, entitled ACHIEVING NEAR-ZERO ADDED LATENCY FOR MODERN ANY POINT IN TIME VM REPLICATION, filed the same day herewith. The aforementioned applications are incorporated herein in their respective entireties by this reference.

FIELD OF THE INVENTION

Embodiments of the present invention generally relate to data replication. More particularly, at least some embodiments of the invention relate to systems, hardware, software, computer-readable media, and methods for reducing latency in data replication processes.

BACKGROUND

Many any-point in time (any-PIT) OS kernel-based replication solutions incur Input/Output operation (IO) latency on the protected machine. This is due to the kernel module intercepting each IO and synchronously sending it over the network to a replication appliance as part of the IO path. For example, write IO latency is the round-trip-time (RTT) between an IO intercepting software, such as a splitter, and a replication appliance (RPA). This RTT is typically a few hundreds of microseconds, which is on the same order of magnitude for spindle disks accessed over SAN/iSCSI, or even slow SSDs. In fact, circumstances have arisen in which communication speeds, such as along IO paths, are not keeping pace with memory and storage write speeds. Correspondingly, latency in communications is becoming increasingly problematic. Because typical PIT approaches involve often significant latency, users may attempt to avoid the problem by deciding not to replicate high performance applications so as to avoid a performance hit, even if such applications are mission critical.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
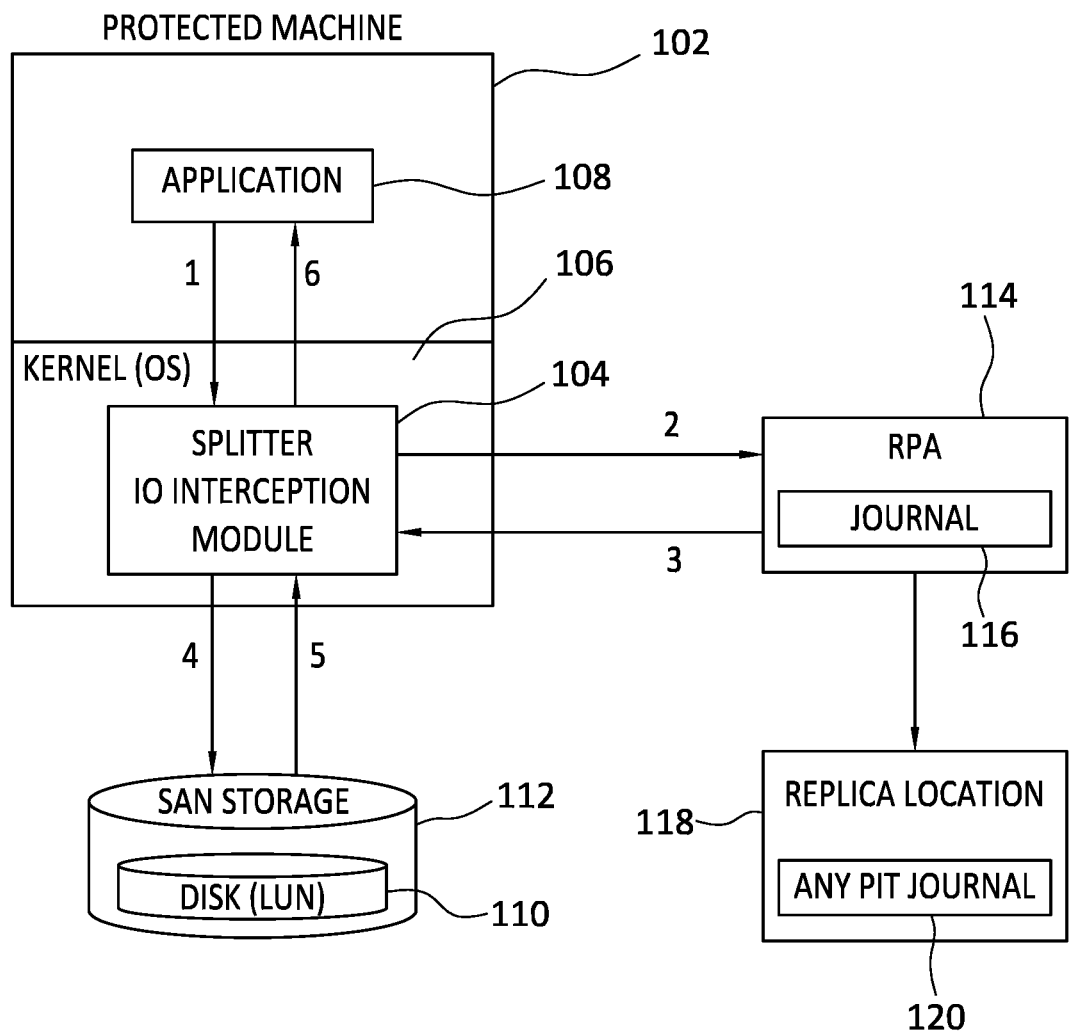
FIG. 1 discloses aspects of a comparative example for illustration purposes.

Embodiments of the present invention generally relate to data replication. More particularly, at least some embodiments of the invention relate to systems, hardware, software, computer-readable media, and methods for reducing latency in data replication processes.

In general, example embodiments of the invention embrace approaches that may eliminate added IO latency for a protected machine, which may be a virtual machine (VM) or a physical machine, while maintaining any-point-in-time restore capabilities. Thus, some embodiments may employ a splitter-journal which is a small, temporary, journal maintained in-memory and sent to the RPA asynchronously. The use of splitter-journals may eliminate the need to send the IOs to the RPA inline on the IO path. Further, the use of non-volatile memory (NVM) technology on the protected machine may help to achieve a reduction in IO latency, while preserving any-PIT restore capabilities with respect to the protected machine.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that latency on the IO path of a machine may be reduced. An embodiment of the invention may provide any-PIT replication capabilities. An embodiment of the invention may provide any-PIT replication capabilities while also reducing latency, such as write latency for example, on the IO path of a protected machine. Embodiments of the invention may be effectively employed both with physical machines, and VMs.

A. Aspects of an Example Operating Environment and Processes

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, replication operations and operations related to replication.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Aspects of a Comparative Example

With particular attention first to FIG. 1, a brief overview is provided by way of a comparative example that will aid in the illustration of various concepts within the scope of the invention. In general, embodiments of the invention may be employed in connection with operating system (OS) kernel-based replication platforms that may operate to protect physical machines, as well as VMs. A protected machine, whether physical or a VM, may be referred to herein simply as a 'machine.' One example of such a replication platform is Dell-EMC RecoverPoint.

As shown in the comparative example of FIG. 1, the illustrated protected machine 102 includes a splitter IO interception module 104 within the OS kernel 106. The splitter IO interception module 104 can thus intercept IOs directed by an application 108 to one or more machine disks (LUN) 110 which may comprise elements of a storage environment 112, such as a Storage Area Network (SAN). Particularly, the storage environment 112 may expose the LUNs 110 to the protected machine 102. The LUNs 110 may be protected by RecoverPoint using the splitter IO interception module 104 and a RecoverPoint Appliance (RPA) 114.

In this comparative example, a replication flow, implemented by the splitter IO interception module 104, might proceed as follows:
1. Intercept Write IO;
2. Send copy of IO to the RPA;
3. Ack (acknowledgement) from RPA;
4. Send IO to the storage;
5. Ack (acknowledgement) from storage; and
6. Ack (acknowledge) the IO to the application.

The RPA 114 may keep a journal 116 of incoming IOs, and will send the intercepted IOs asynchronously to a replica location 118 where they can be saved in an Any-PITJournal 120. In this example, significant latency may be added by certain aspects of the replication flow, such as 2 Send copy of IO to the RPA. The process 2 may add several hundred microseconds to the overall replication flow. This is because the splitter IO interception module 104 would copy the incoming 10, and then send the IO copy to the RPA. Further, communication processes such as 2 and 3 may be significantly slower than disk processes such as processes 4 and 5.

Thus, in the comparative example of FIG. 1, the latency introduced by process 2, for example, would adversely impact hi-performance applications 108, which are connected to high-end storages with ultra-low latency, such as the storage environment 112. Correspondingly, the storage environment 112 may not realize its full potential, since the communication latency of process 2 for example may significantly undercut the benefit provided by high speed storage. This may be of particular concern in view of the fact that the latency incurred by storage continues to drop. For example, some NVMe and SSDs have dropped below 100 μs latency.

C. Aspects of Some Example Embodiments

At least some embodiments of the invention involve the use of non-volatile memory (NVM) in a protected machine. A variety of different NVM technologies may be employed in example embodiments including, but not limited to, Storage Class Memory (SCM). In some embodiments, NVM may be employed that takes the form of persistent memory installed inside the protected machine, with a very low latency (such as about 1-10 μsec), and relatively low cost. NVMs may be configured either as another disk, or a cache layer for the storage such as Dell EMC VxFlex, or as memory-addressable, and thus not accessed using storage/IO constructs. As used herein, NVM also embraces Non-Volatile Random Access Memory (NVRAM), and Non-Volatile Dual In-line Memory Modules (NVDIMM). Other DIMMS may include, for example, NAND+DRAM DIMMS and XP DIMMs/ReRAM. Other NVMs that may be employed in some embodiments include Fast NAND SSDs, and 3D XP SSD. However, the scope of the invention is not limited to the use of any particular type of NVM. Thus, the foregoing are presented only by way of example, and are not intended to limit the scope of the invention in any way. Following is a discussion of some aspects of example embodiments of the invention.

In general, embodiments of the invention concern a method of OS kernel-based replication, which does not incur the write IO latency such as would be experienced with the configuration in the comparative example of FIG. 1. For example, in some embodiments, the splitter may not send each write IO to the RPA inline of the IO path. Instead, the splitter may copy the IO in memory and then forward the IO to the machine disk. Saving a copy of the IO in memory may be a relatively fast operation, thus there is virtually no added latency to the IO path. If the protected machine has NVRAM for example, the splitter may use non-volatile memory for this IO journaling. The IO journal saved in memory may be sent to the RPA asynchronously.

In more detail, embodiments of the invention may employ a Journal Manager (JM) in the splitter running in the machine OS kernel. The JM may maintain an in-memory journal which saves all incoming IOs to the splitter in two streams: a metadata stream and data stream. With reference to the particular example of a RecoverPoint system, the JM saved by the splitter may be referred to as a "DO" stream. The DO stream may contain IOs in a specific order, which may be sent to a replica site. In some embodiments, respective journals may be kept separately for each consistency group (CG). For simplicity, it may be assumed that, for some embodiments, a CG contains one or more disks (LUNs) that are accessed by a single protected machine. The protected machine may have multiple disks and the splitter-journal will be per CG, shared for IOs to all disks in the CG, thus maintaining consistency across the various disks of the given machine. There may be more than one CG per machine. To illustrate, disks 1 and 2 of a machine may be in CG1, and disks 3, 4 and 5 of that same machine may be in CG2. The data saved in the splitter-journal may include, for example: IO data buffer; IO metadata such as, but not limited to, volume ID, IO offset, and IO length; and, IO number or timestamp—this may allow parallel sending and retries of IOs.

Figure 2:
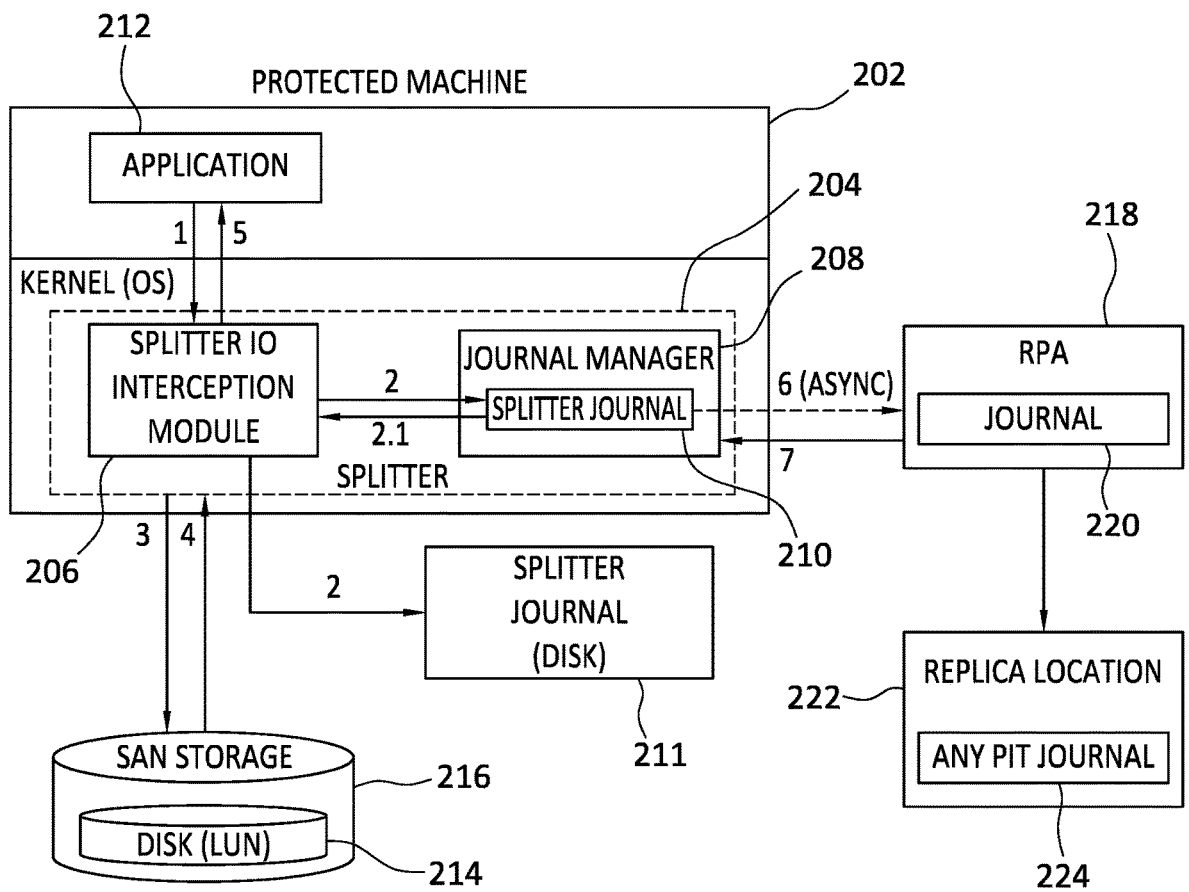
FIG. 2 discloses aspects of an example architecture and IO flow.

With reference now to FIG. 2, aspects of some example embodiments are discussed. In the example of FIG. 2, a protected machine 202 may include a splitter 204, which may be an OS-based splitter, that comprises a splitter IO interception module 206, and a journal manager 208 that may include one or more splitter journals 210. The journal manager 208 may reside on memory-accessed NVM, or storage-accessed NVMe, within the OS kernel of the protected machine 202. In some embodiments, one splitter journal 210 is provided for a consistency group, so that disks of the consistency group can be maintained in a consistent state with respect to each other. That is, the protected machine 202 may have multiple disks that may need to be maintained in a consistent state with each other. Where the protected machine is virtual, the protected machine may have multiple splitter journals 210. In some embodiments, the splitter journal(s) 210 may reside in memory in the OS kernel. In other embodiments, the splitter journal(s) 210 may reside outside the protected machine 202, on storage 211 such as one or more disks for example.

The protected machine 202 may further include one or more applications 212. The splitter IO interception module 206 may intercept IOs issued by the application 212 to one or more machine disks (LUN) 214 which may comprise elements of a storage environment 216, such as a SAN for example. The storage environment 216 may comprise one or more disks for storing production data generation by the application 212. Particularly, the storage environment 216 may expose the LUNs 214 to the protected machine 202. The LUNs 214 may be protected by the splitter IO interception module 206, journal manager 208, and a recovery module 218 such as a Dell EMC RecoverPoint Appliance (RPA) for example. Finally, the recovery module 218 may keep a journal 220 of incoming IOs, and will send the intercepted IOs asynchronously to a replica location 222 or, more generally, a replication site, where they can be saved in an Any-PIT Journal 224.

With continued reference to the example of FIG. 2, embodiments of the invention may provide for an IO path in a protected machine that may reduce latency in operations at least in part by introducing an asynchronous relation between the transmission of journal IOs to the recovery module 218, and the IO flow from the application 212 to the storage environment 216. Particularly, an example IO flow implemented by embodiments of the invention may proceed as follows:

1. Intercept machine write IO from the application;
2. Write the IO data and metadata to the splitter journal in memory (ack is immediate);
3. Send IO to the machine storage;
4. Ack (acknowledgement) from storage;
5. Ack (acknowledge) the IO to the application; and
6. Outside of the main IO flow, send the journal IOs to the replication module asynchronously.

As can be seen from FIG. 2, and with reference to the comparative example of FIG. 1, the latency of the round-trip to the RPA, processes 2 and 3 in FIG. 1, has been eliminated from the write IO path in the configuration of FIG. 2. Instead, and as discussed below, process 6 of FIG. 2 is performed asynchronously relative to processes 1, 3, 4 and 5, of FIG. 2, with the result that process 6 does not impose any latency on the write IO path 1 and 3 between the application 212 and the storage environment 216. Because, as noted herein with respect to the example of FIG. 1, the latency imposed by processes 2 and 3 in FIG. 1 may be significantly greater than the latency imposed, whether individually or collectively, by the processes 1, 4, 5, and 6 in FIG. 1. Thus, in some embodiments, the most significant improvement in latency reduction may be obtained by reducing or eliminating the latency associated with communications to/from a replication module, such as has been done in the example embodiment of FIG. 2 with respect to replication module 218.

With continued reference to the example IO flow and configuration of FIG. 2, the journal manager 208 may send the IOs accumulated in the splitter journal 210 to the replication module 218 asynchronously relative to the IO path operations. Upon ack (acknowledgement) 7 from the replication module 218, the journal manager 208 may clear the sent IO portions from the splitter journal 210. This process of clearing of the splitter journal 210 may be referred to herein as a 'journal evacuation' flow. In some embodiments, the journal evacuation may be done in sequence from the oldest IO to the newest, in order to maintain write order fidelity.

In some embodiments, the journal IOs may be sent from the splitter journal 210 to the replication module 218 in parallel, that is, in batches of multiple IOs each. Each of the journal IOs may be numbered in consecutive order, or timestamped, for example, to preserve write order fidelity at the replication module 218, and in the event a send process should fail, provision may be made for one or more retries. Sending the journal IOs in batches, rather than on an individual basis, may improve the total replication throughput as compared with an unbatched approach to replication, for example, in cases where the production IOs were small, such as about 4 KB. Batching may reduce the number of IOs per seconds (IOPS) sent from the splitter journal 210 to the replication module 218.

D. Aspects of Some Embodiments Concerning Restarts

Embodiments of the invention may provide for various components and processes to be employed in connection with possible restarts of one or both of the protected machine 202 and/or the splitter 204. For example, it may be the case that the information about an IO resides only in the splitter 204 memory, specifically, inside the splitter journal(s) 210, until the journal portion of that IO is sent to the replication module 218. In the case of a planned reboot, for example, of the protected machine 202, the splitter 204 may delay the restart of the protected machine 202 until all splitter journal 210 data is evacuated to the replication module 218, and/or saved persistently to disk, such as a splitter journal disk 211. In this way, the replication module 218 may be synchronized with the storage environment 216.

In contrast with a planned restart such as that just described, an unexpected restart may present some particular challenges. For example, in the case of an unexpected splitter 204 restart, such as may occur in a protected machine 202 crash scenario for example, the replication system may require a resynchronization of all the disks of the protected machine 202. This is because an IO may have been written to the storage environment 216, but that IO may not yet have been recorded at the replication module 218 due to asynchronous updating of the replication module 218 by the splitter journal 210.

The resynchronization of the disks of the protected machine 202 may be referred to as a "full sweep" and may take a long time, possibly hours, depending on considerations such as the size of the disk(s) that are being resynchronized, and the available bandwidth for transmitting the IOs needed for resynchronization, for example. The full sweep may be required when, for example, the replication system, which must ensure that all IOs to the disks of the production machine, that is, the protected machine 202, are replicated to the replica machine disks by the replication module 218, has lost track of all IOs that were in the splitter journal 210, which may have been in memory and thus lost in the restart. Moreover, there may be no way to know what areas of the replication disk were written to, so all the replication disks must be resynced with the disks of the protected machine 202. Embodiments of the invention provide for mechanisms to address the circumstances of an unexpected restart of the splitter 204.

For example, some embodiments of the invention employ NVM to save the splitter journal 210 persistently, while providing for low-latency access for IO data and metadata writes to the splitter journal 210, as in process 2 in FIG. 2. Because the splitter journal 210 may thus be persistently stored, the splitter 204 may read the splitter journal 210 upon restart, and the evacuation of the splitter journal 210 may then continue from the same place where evacuation had stopped as a result of the unplanned restart of the splitter 204. In this way, the need for a full sweep may be avoided. Although the NVM that stores the splitter journal 210 may persistently preserve the splitter journal 210, it may be the case in some instances that the NVM is not accessible when the protected machine 202 is down.

Depending upon the embodiment, the NVM for the splitter journal 210 may be memory-accessed or storage-accessed. In some embodiments, memory-accessed NVM, such as NVRAM for example, may be desirable since memory-accessed NVM would permit use of the same, or similar, IO flow as disclosed in FIG. 2. On the other hand, use of storage-accessed NVM to store the splitter journal 210, such as NVMe for example, may be effective as well in but may require that process 2 writes the data to the splitter journal 210 on the storage-accessed NVM, and only after getting an ack, process 2.1 in FIG. 2, the IO is sent to the production disk at the storage environment 216. Note that in a case where the splitter journal 210 is stored externally to the protected machine 202, such as on storage 211, which may be disk or memory, a restart of the protected machine 202 may not require a full sweep.

E. Aspects of Some Example Methods

Figure 3:
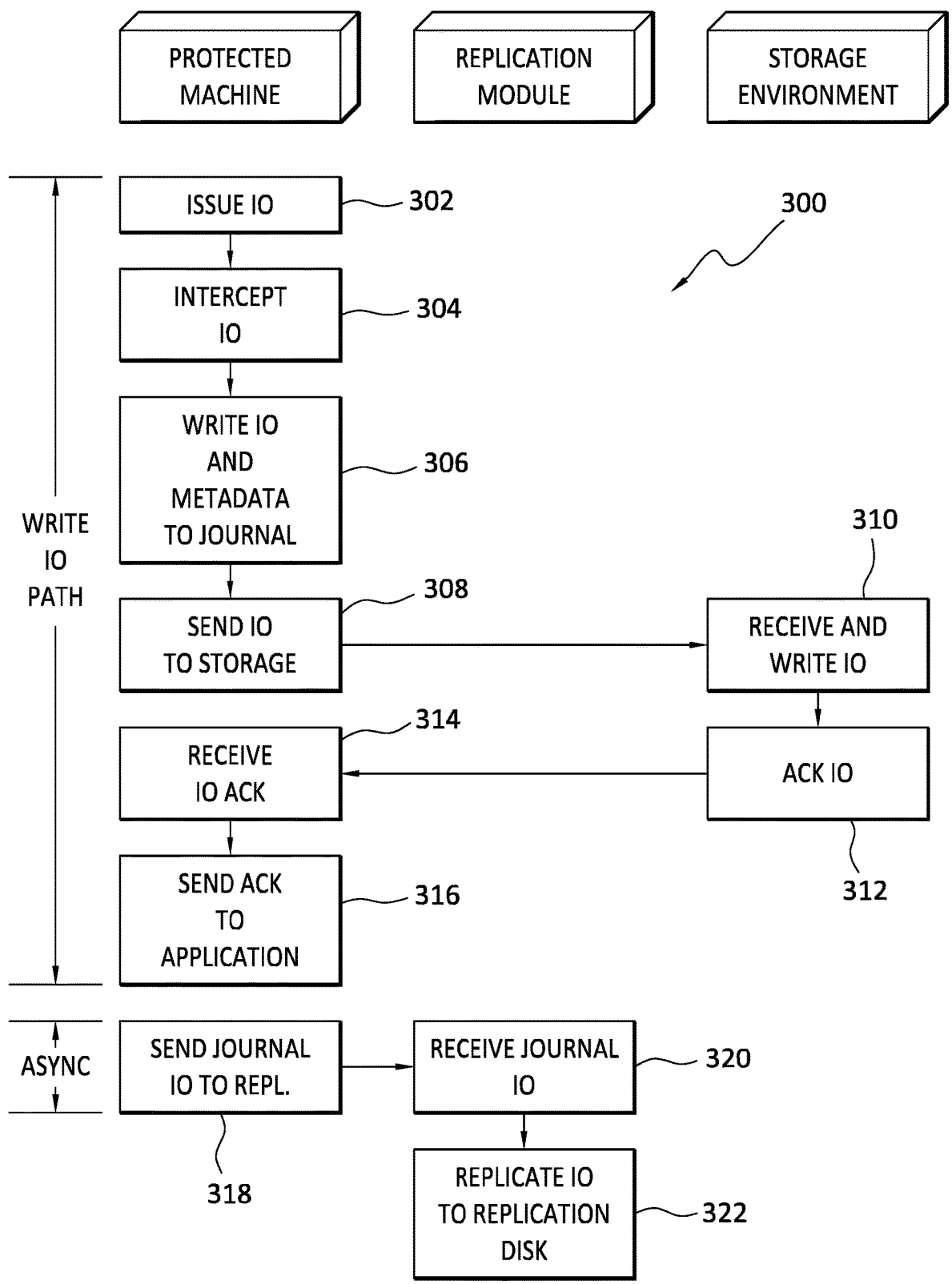
FIG. 3 discloses aspects of an example method.

With reference next to FIG. 3, details are provided concerning some methods for replicating the data of a protected machine without imposing latency, such as write IO latency, on an IO path between an application of a protected machine and a storage environment. One example of such a method is denoted generally at 300. Example embodiments of the method may involve operations of a protected machine, replication module, and storage environment. Other embodiments may employ additional, or alternative, components however, and the scope of the invention is not limited to the aforementioned example embodiments.

The example method 300 may begin at 302 when an application, which may reside on or be hosted by a production machine that is protected by a replication process, issues an IO, such as a write IO for example. The IO may be intercepted 304 by a splitter IO interception module of the machine. The IO, and metadata concerning the IO, such as the identification of the application, and a timestamp, for example, may then be written to a splitter journal 306 on NVM of the machine. In some embodiments, the splitter journal may reside on a disk, storage, or memory, external to the protected machine.

Because the splitter journal may reside on NVM, the writing of the IO and metadata to the splitter journal may be a relatively fast process, as compared with a process in which the IO and metadata were transmitted to a replication module. Thus, the writing of the IO and metadata to the splitter journal may not impose any material latency to the overall write IO path from the application to the storage environment.

After the IO and metadata have been written to the splitter journal 306, the IO and metadata may then be sent 308 by the splitter IO interception module to a storage environment, such as a production storage environment for example. The storage environment may then receive and write 310 the IO and metadata received from the splitter IO interception module. Receipt of the IO and metadata may be acknowledged 312 by the storage environment to the splitter IO interception module, which may receive 314 the acknowledgement. Acknowledgement of the storage of the IO and the metadata may then be acknowledged 316 by the splitter IO interception journal to the application that issued the 10.

At any time after the IO and metadata are written to the splitter journal 306, one or more IOs, and their respective associated metadata, including the IO and metadata written at 306, in the splitter journal may be evacuated 318, either individually or in batches, to the replication module. The replication module may then receive 320 the IOs and metadata, and replicate the IOs and metadata 322 to a replication disk.

E. Further Example Embodiments

Following are some further example embodiments of the invention. These are presented only by way of example and are not intended to limit the scope of the invention in any way.

Embodiment 1. A method, comprising: intercepting an IO issued by an application; writing the IO and IO metadata to a splitter journal in NVM; forwarding the IO to storage; and asynchronous with operations occurring along an IO path between the application and storage, evacuating the splitter journal by sending the IO and IO metadata from the splitter journal to a replication site.

Embodiment 2. The method as recited in embodiment 1, wherein sending the IO and IO metadata from the journal to the replication site does not increase a latency associated with the operations between the application and storage.

Embodiment 3. The method as recited in any of embodiments 1-2, wherein a splitter within an OS kernel of a VM performs the operations of: writing the IO and IO metadata to the splitter journal in NVM; forwarding the IO to storage; and, sending the acknowledgement to the application.

Embodiment 4. The method as recited in any of embodiments 1-3, wherein the IO and IO metadata are transmitted from the splitter journal to the replication site on a path other than the IO path.

Embodiment 5. The method as recited in any of embodiments 1-4, wherein the IO path comprises a path between the application and a splitter, and a path between the splitter and the storage.

Embodiment 6. The method as recited in any of embodiments 1-5, wherein the IO and IO metadata are sent from the splitter journal to a replication site as part of a batch of IOs and IO metadata.

Embodiment 7. The method as recited in any of embodiments 1-6, wherein the NVM is either memory-accessed NVM, or storage-access NVM.

Embodiment 8. The method as recited in any of embodiments 1-7, wherein the method is performed by a splitter within an OS kernel of a VM, or an OS kernel of a physical machine.

Embodiment 9. The method as recited in any of embodiments 1-8, further comprising: receiving an acknowledgement from the storage after the IO has been forwarded to the storage; and sending an acknowledgement to the application after the acknowledgement has been received from the storage.

Embodiment 10. The method as recited in any of embodiments 1-9, further comprising experiencing a crash of a machine in connection with which the method is performed and, after restart of the machine, resuming evacuation of the splitter journal at a point where evacuation had previously ceased due to the crash of the machine.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
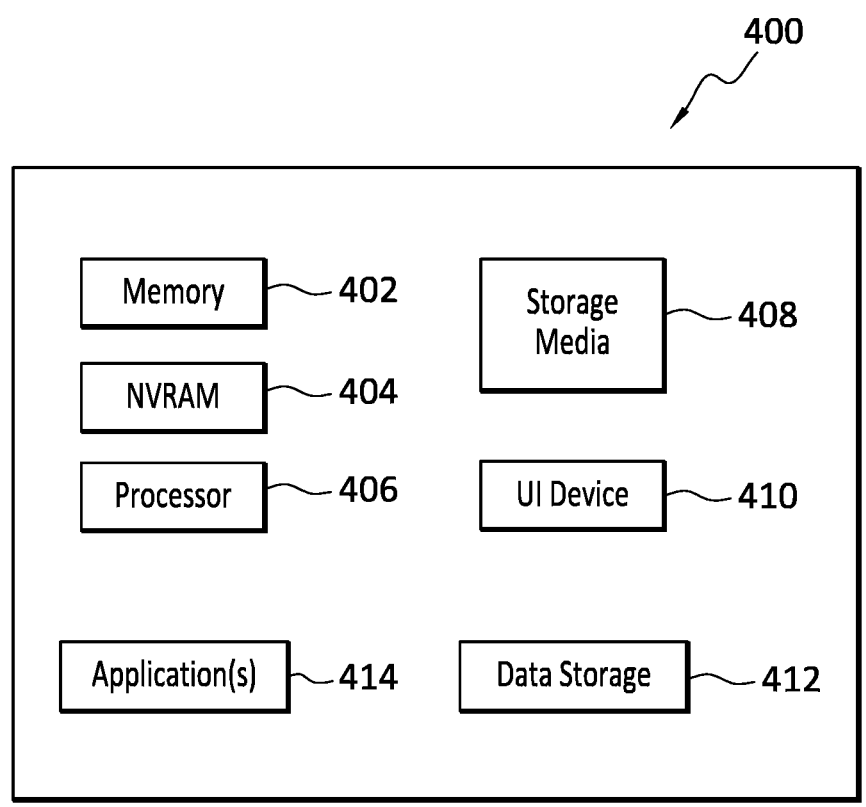
FIG. 4 discloses aspects of an example computing device.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), NVM such as non-volatile random access memory (NVRAM) 404 or any of the other NVM disclosed herein, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    intercepting, by an interceptor within an Operating System (OS) kernel, an Input/Output (IO) issued by an application;
    writing, by a journal manager within the OS kernel, the IO and IO metadata to a splitter journal in Non-Volatile Memory (NVM);
    forwarding the IO to storage; and
    asynchronous with operations occurring along an IO path between the application and storage, evacuating the splitter journal by sending the IO and IO metadata from the splitter journal to a replication site.

2. The method as recited in claim 1, wherein sending the IO and IO metadata from the splitter journal to the replication site does not increase a latency associated with the operations between the application and storage.

3. The method as recited in claim 1, wherein a splitter within an OS kernel of a Virtual Machine (VM) performs the operation of: forwarding the IO to storage.

4. The method as recited in claim 1, wherein the IO and IO metadata are transmitted from the splitter journal to the replication site on a path other than the IO path.

5. The method as recited in claim 1, wherein the IO path comprises a path between the application and a splitter, and a path between the splitter and the storage.

6. The method as recited in claim 1, wherein the IO and IO metadata are sent from the splitter journal to a replication site as part of a batch of IOs and IO metadata.

7. The method as recited in claim 1, wherein the NVM is either memory-accessed NVM, or storage-access NVM.

8. The method as recited in claim 1, wherein the method is performed by a splitter within an OS kernel of a VM, or an OS kernel of a physical machine.

9. The method as recited in claim 1, further comprising:
    receiving first acknowledgement from the storage after the IO has been forwarded to the storage; and
    sending a second acknowledgement to the application after the first acknowledgement has been received from the storage.

10. The method as recited in claim 1, further comprising experiencing a crash of a machine in connection with which the method is performed and, after restart of the machine, resuming evacuation of the splitter journal at a point where evacuation had previously ceased due to the crash of the machine.

11. A non-transitory storage medium having stored therein instructions that are executable by one or more hardware processors to perform operations comprising: intercepting, by an interceptor within an Operating System (OS) kernel, an Input/Output (IO) issued by an application;
    writing, by a journal manager within the OS kernel, the IO and IO metadata to a splitter journal in Non-Volatile Memory (NVM);
    forwarding the IO to storage; and
    asynchronous with operations occurring along an IO path between the application and storage, evacuating the splitter journal by sending the IO and IO metadata from the splitter journal to a replication site.

12. The non-transitory storage medium as recited in claim 11, wherein sending the IO and IO metadata from the splitter journal to the replication site does not increase a latency associated with the operations between the application and storage.

13. The non-transitory storage medium as recited in claim 11, wherein a splitter within an OS kernel of a Virtual Machine (VM) performs the operation of: forwarding the IO to storage.

14. The non-transitory storage medium as recited in claim 11, wherein the IO and IO metadata are transmitted from the splitter journal to the replication site on a path other than the IO path.

15. The non-transitory storage medium as recited in claim 11, wherein the IO path comprises a path between the application and a splitter, and a path between the splitter and the storage.

16. The non-transitory storage medium as recited in claim 11, wherein the IO and IO metadata are sent from the splitter journal to a replication site as part of a batch of IOs and IO metadata.

17. The non-transitory storage medium as recited in claim 11, wherein the NVM is either memory-accessed NVM, or storage-access NVM.

18. The non-transitory storage medium as recited in claim 11, wherein the operations are performed by a splitter within an OS kernel of either a physical machine or a VM.

19. The non-transitory storage medium as recited in claim 11, wherein the operations further comprise:
  receiving first acknowledgement from the storage after the IO has been forwarded to the storage; and
  sending a second acknowledgement to the application after the first acknowledgement has been received from the storage.

20. The non-transitory storage medium as recited in claim 11, wherein the operations further comprise experiencing a crash of a machine in connection with which the non-transitory storage medium is performed and, after restart of the machine, resuming evacuation of the splitter journal at a point where evacuation had previously ceased due to the crash of the machine.

* * * * *